Dec. 30, 1958 G. AXT ET AL 2,866,330
INSTRUMENT FOR GAS ANALYSIS WITH HEATED WIRE SYSTEM
Filed July 2, 1953 3 Sheets-Sheet 1
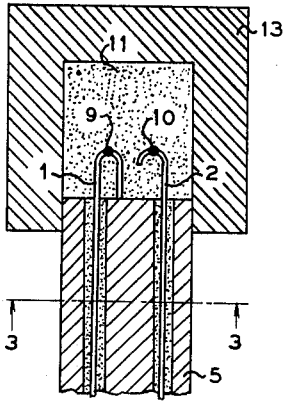
FIG. 1
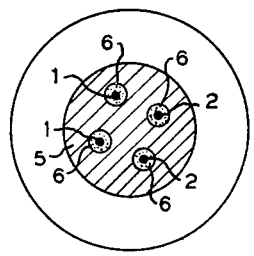
FIG. 3
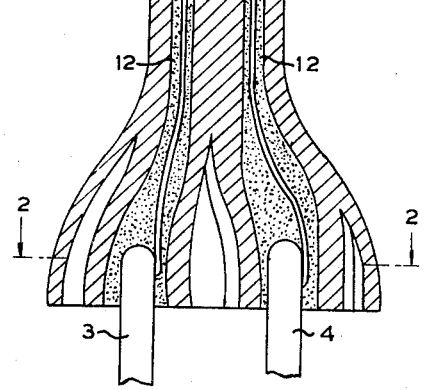
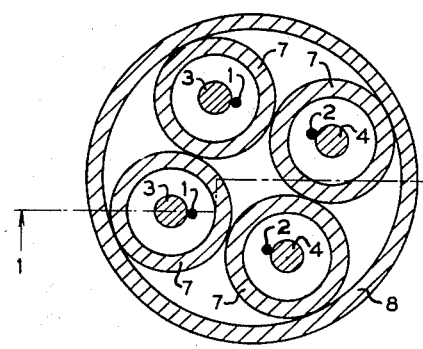
FIG. 2
INVENTORS.
GUNTER AXT
FRIEDRICH LOTZ
BY F. R. Jenkins
Agent

INVENTORS.
GUNTER AXT
FRIEDRICH LOTZ

Dec. 30, 1958  G. AXT ET AL  2,866,330
INSTRUMENT FOR GAS ANALYSIS WITH HEATED WIRE SYSTEM
Filed July 2, 1953  3 Sheets-Sheet 3
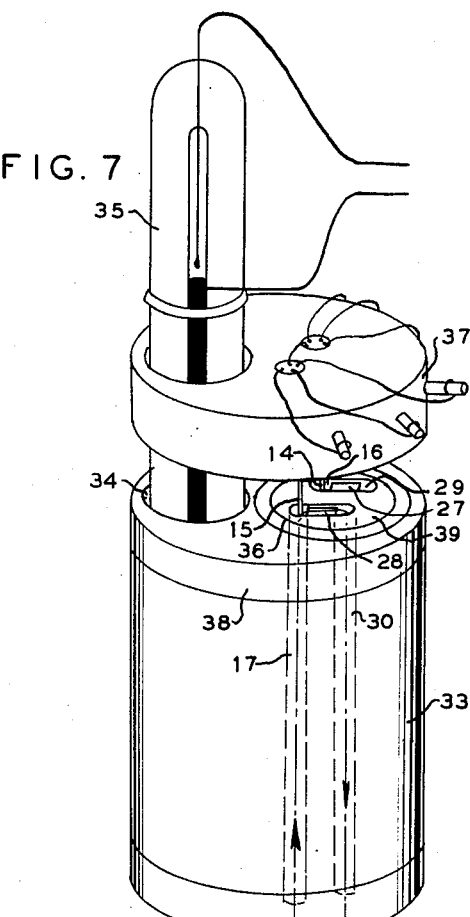
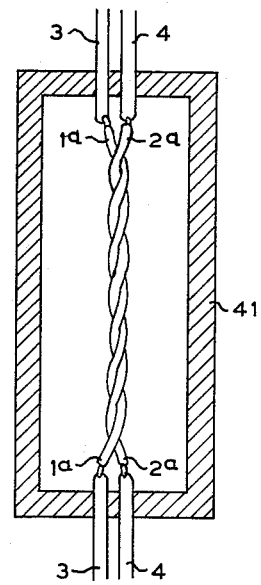
FIG. 8
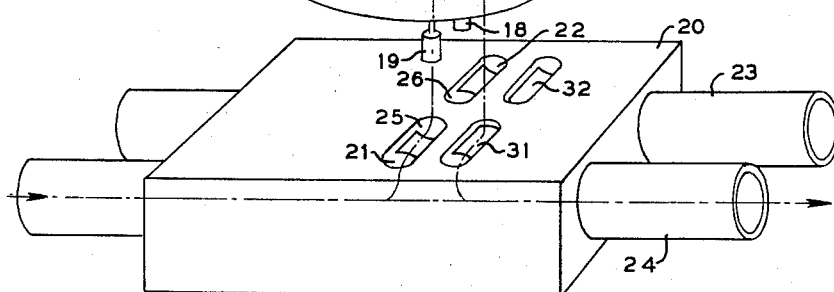
INVENTORS.
GUNTER AXT
FRIEDRICH LOTZ
BY F. R. Jenkins
Agent United States Patent Office 2,866,330
Patented Dec. 30, 1958

2,866,330

INSTRUMENT FOR GAS ANALYSIS WITH HEATED WIRE SYSTEM

Günter Axt, Frankfurt am Main, and Friedrich Lotz, Frankfurt am Main-Nied, Germany, assignors to Hartmann & Braun Aktiengesellschaft, Frankfurt am Main, Germany, a corporation of Germany Application July 2, 1953, Serial No. 365,670

Claims priority, application Germany July 10, 1952

15 Claims. (Cl. 73—27)

The general object of the present invention is to provide instruments for analysing the composition of gases where heating wires are arranged in the measuring and comparison chambers. The gas to be tested is led into the measuring chambers, whereas the comparison chambers are mostly supplied with air or a constant comparison gas. The heating wires are incorporated in a Wheatstone bridge. The instruments function in such a way that the temperature of the heating wires varies according to the composition of the gas; this variation results in a modification of the resistance of the heating wires. This variation of resistance is measured by the Wheatstone bridge by connecting an indicating instrument to that diagonal of the bridge which is not destined for the current supply.

The variation of temperature due to the composition of the gas may be produced by different reasons. According to these reasons different methods are obtained for the gas analysis by means of heating wires. The first method makes use of the variation of the heat conductivity due to the composition of gas. Hydrogen has for instance a much higher heat conductivity than oxygen. A heating wire exposed to a mixture of hydrogen and oxygen therefore cools down more due to the high heat conductivity of the hydrogen than it is the case with pure oxygen. If therefore the mixture of hydrogen and oxygen to be tested is introduced into the measuring chamber and if the oxygen is led to the comparison chamber, the temperature of the wire in the measuring chamber decreases according to the increase of hydrogen. The indicating instrument can be calibrated directly in percentages of hydrogen.

When using the instrument for gas analysis for the determination of combustible substances, the heat produced by the combustion is made use of. By introducing catalysers into the measuring chambers, the combustion of combustible substances in the measuring gas is started, e. g. for carbon monoxide already at low temperatures. Due to the combustion there is an increase of the temperature which again is measured by the corresponding heating up of the wire. In this case the heated wire produces simultaneously the required temperature for the combustion.

A further possibility for gas analysis is the utilisation of the so-called "magnetic wind" which due to the different susceptibility of the gases is obtained in an inhomogenous field during the heating. As a rule, this method is used for determining oxygen, because due to its high susceptibility oxygen differs considerably from the other gases. This magnetic wind is obtained when the heated wire is introduced into an inhomogenous magnetic field. Due to the heating, the oxygen heated nearest the heated wire has a lower susceptibility than the oxygen being more distant and therefore colder. The latter is drawn into the range of highest field intensity with greater strength than the heated oxygen, and in this way the heated oxygen is displaced. This process results in a circulation which is called magnetic wind. This circulation cools additionally the heated wire and this cooling down depends on the contents of oxygen. Therefore the deflection of the bridge instrument represents again a measure for the contents of oxygen.

For all these three methods it is important to influence as far as possible the heat produced in the wire by the measuring effect proper, for only then a maximum efficiency of the instrument wil be obtained. For the heat conductivity it is therefore required to lead off possibly all heat only due to the heat conductivity of the gas in order to obtain a great variation of temperature due to the variation of the heat conduction. For the catalytic combustion the heat produced in this way must possibly be led completely to the heated wire in order that its heating be as high as possible. For the magnetic gas analysis the discharge of heat must be produced completely by the generated circulation, if possible. All other sources influencing the heated wire by heat increase or decrease must be eliminated as far as possible. There is specially the discharge of heat which must be reduced as far as possible which never can be eliminated entirely due to the fixation of the heated wire.

The object of this invention is to create such a specially efficient heated wire system. The aim shall also be to keep the dimensions of the heated wire system as small as possible in order to obtain also small dimensions for the measuring chambers and the whole instrument as well as gas consumption.

According to the invention the heated wires of two opposite branches of the bridge are arranged to a uniform heating element, the wires being approached as closely as possible. In this way a much better effect is produced than with the arrangement of two correlated heated wires separately in a chamber.

For manufacturing a heated wire system according to the invention different methods can be recommended. It is often desired to protect the heated wires from the direct contact with the measuring gas by means of a protective tube or a protective cover. Both heated wires are then mounted in bore holes of a common protective tube and fixed by means of melted glass or by heating in case the protective tubes are made of glass; furthermore there is the possibility to fill subsequently the bore holes of the protective tubes with electrically insulating material. Another possibility is to twist the insulated heated wires with each other in order to obtain a uniform heating element. The twisted heated wires can furthermore be provided with an external protection.

A specially efficient design will be obtained when using a protective tube being open at one side and provided with four bore holes into which the heated wires are introduced like a hairpin. In this case the protective tube must be supported only unilaterally which is very advantageous with regard to the construction and losses caused by heat conduction at the points of fixation.

Below we give a detailed description of the invention by means of examples.

Fig. 1 shows a longitudinal cross section of the heated wire system proper, the section being taken along the line 1—1 of Fig. 2.

Fig. 2 shows a transverse section of the heated wire system at the line 2—2 in Fig. 1.

Fig. 3 shows a transverse section of the support of the heated wire system at the line 3—3 in Fig. 1.

Fig. 7 shows the usual arrangement of the measuring chamber for carrying out measurements according to the method of heat conductivity.

Fig. 8 shows another form of the heated wire system and external protection therefor.

Figure 4:
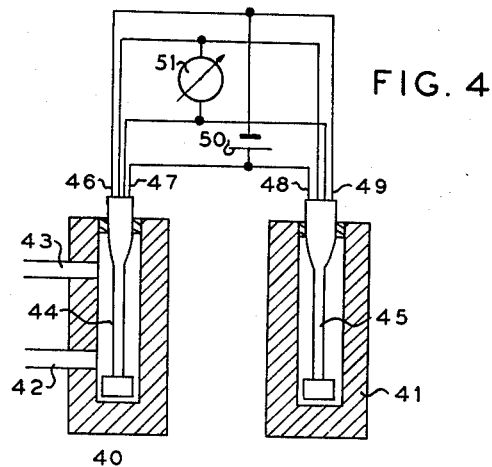
Fig. 4 shows a principle of connection of the instrument for gas analysis based on the method of measuring the conductivity.

The heated wire system shown in Figs. 1 to 3 consists of a capillary tube 5 with four bore holes 6 where the heated wires are arranged like hairneedles. The heated wires 1 and 2 being bent like hairneedles are welded at their ends to thicker wires 3 and 4. For a higher sensitivity it is essential that the heated wire system be kept as thin as possible in order to avoid losses due to heat conduction.

The following method is suitable for arranging the two hairneedle-shaped heated wires (i. e. four wires in the cross section) in a capillary of 0.25 mm. outer diameter. Four thin tubes are slipped into a common protective tube 8 and the whole must be drawn out to capillary or stem 5 (Figs. 1 and 2) which is then cut to the length required. The capillary is then open at the upper end; at the lower end of the part which has not been drawn out the tube has still its original width. Now four thin wires to which the thicker incoming wires are welded must be introduced through these wider tubes. Then each two of the ends projecting from the four capillaries are welded together (welding points 9 and 10 in Fig. 1). In this way the hairpin-shaped heated wires 1 and 2 are obtained to which each two connection wires 3 and 4 belong. The upper end of the capillary is then closed by melting or by means of a small plug of cement. It is furthermore recommendable to fill the capillary before closing it with suitable synthetic resin 12 for improving the passage of heat between the wire and the tube and for fixing the heated wires. For this purpose modern plastic materials have proved to be most suitable which, when hardening, do not produce any deposits. The heated wires can also be fixed in the glass by heating it somewhat. For a design which practically would come into question the following dimensions have been found for the heated wire system:

| | Mm. |
|---|---|
| Diameter of the heated wires | 0.02 |
| Inside diameter of the capillary bore holes | 0.03 |
| Outer diameter of the fourfold capillary | 0.25 |

Such a heated wire system is very elastic and it will require a special adjustment in order to arrange it in the sealing of the measuring chamber concentrically. In order to obtain a good centering the front top of the heated wire system is provided with a slight thickening which with some tolerance fits into the bore hole of the measuring chamber. The heat conduction at the areas of contact is very low in this case. The thickening can be obtained by a melted glass bead or by a plug of cement 11; still better would be a little cap 13 (Fig. 1) to be fixed by insulating cement and which can easily be obtained with the corresponding tolerances. The aforementioned glass bead is generally similar in shape to combined cement 11 and cap 13. In other words the cement and cap may be glass and integral with the capillary 5.

Fig. 4 is a schematic drawing showing the arrangement of the heated wire systems in the appropriate circuit in case there is an instrument for heat conductivity. 40 is the measuring chamber for the gas to be tested and 41 represents a comparison chamber which, for instance, is filled with air. The gas to be tested is led in at 42 and flows off again at 43. In the chambers there is each a heated wire system 44 and 45 as illustrated by Figs. 1 to 3. As previously mentioned, the heated wire systems contain each two heated wires the appropriate connections of which are marked with 46, 47, 48 and 49. These heated wires are joined in a bridge, i. e. in two branches situated beside each other there is in each one a heated wire system in the measuring chamber and in the comparison chamber (46 and 49, and 47 and 48), so that the heated wire systems 46, 47 and 48, 49 are in branches situated in opposition. In this way they mutually support their efficiency. The bridge is fed in one diagonal by the battery 50 and in the other diagonal the indicating instrument 51 is connected. The current supplied by the battery is of such an order that, for instance, at the presence of air in both chambers the two heated wire systems assume an excess temperature of 100° as compared with the wall of the chambers. If hydrogen, e. g. a mixture of hydrogen and air, is led into the measuring chamber, the heat conductivity of the gas in the measuring chamber increases and at a constant heating power for the bridge there is more heat conducted from the heated wire system 44. The heated wire system cools down more and its temperature is therefore below 100°, thus resulting in a variation of its resistance. The bridge will be unbalanced and the indicating instrument shows the contents of hydrogen.

Figure 5:
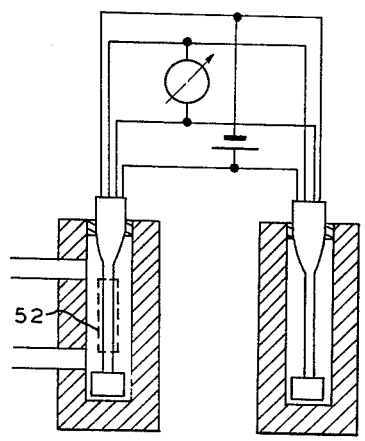
Fig. 5 shows a principle of connection of the instrument for gas analysis based on the method of catalytic combustion.

Fig. 5 shows the same arrangement in case a catalytic combustion takes place. In this case the external wall of the heated wire system in the measuring chamber, i. e. in the glass tube in which the heated wires are arranged, is covered with platinum black or another substance with similar catalytic effect as indicated by 52. By heating the platinum black, combustible components of the measuring gas are burnt catalytically without reaching the ignition temperature. This combustion results in an increase of the temperature the consequence of which will be a special variation of the heated wires. Also in this case an increased efficiency is obtained by joining the heated wires to a uniform heating element.

In Fig. 8 there are shown the heated insulated wires 1a and 2a twisted about each other and disposed in a chamber for instance 41.

Figure 6:
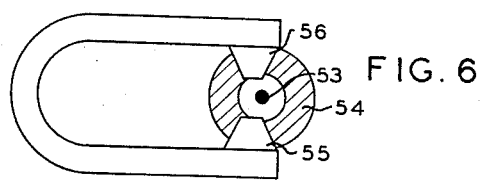
Fig. 6 shows a principle of connection of the instrument for gas analysis based on the magnetic properties of the gas.

For the magnetic oxygen measurement, however, as shown in Fig. 6, a permanent magnet is arranged in such a way that the heated wire of the measuring chamber is situated in the inhomogenous field of this magnet. The magnet is U-shaped as illustrated by the sectional drawing of the measuring chamber with view from the front side. 53 represents the heated wire system in the measuring chamber and 54 the wall of the chamber of non-magnetic material. In this chamber wall two soft iron pole pieces 55 and 56 are fixed excentrically and fit to the U-shaped magnet 52. But there are still more constructions which might be considered for the chambers. The comparison chamber could be without a magnet and designed in the same way as shown by Figs. 4 and 5. Also the connection complies with Figs. 4 and 5. As outlined above, the presence of oxygen in the measuring chamber produces a flow which cools the heated wire system. This cooling is measured by the bridge as mentioned above.

In order to make the measuring equipments described above as far as possible independent from external temperature fluctuations, the measuring and comparison chambers must possibly be arranged in a metal block and protected against external temperature fluctuations. As outlined above, this is obtained by the arrangement of the heated wire systems as recommended by the invention, so that the dimensions of the measuring and comparison chamber can be kept small. The instrument being independent from external temperature fluctuations, the assembly of the instrument will be facilitated considerably. This is explained in details by Fig. 7 showing an instrument for measuring the heat conductivity. The instrument is shown with cover and support removed in order to give a better view of the gas flow. The two heated wire systems 14, 15 destined for the measuring gas and the comparison air are fixed in the lid of the chamber body which is common for both chambers. They project into the two measuring chambers 16, 17 and have such a length that they protrude from them with their thickenings 18, 19. In the support 20 there are the gas leads 21, 22 which are in connection with two tubes 23, 24 through which the measuring and comparison gas is led. The thickenings, however, are outside of the gas lead in appropriate bore holes 25, 26 of the support. If these bore holes are kept thin, the thickenings can be dispensed with and the ends of the heated wire systems can be centered directly. The gas exchange in the chambers is produced by the lift. The warm gas in the chambers moving upwards enters two further bore holes 29, 30 via the indentions 27, 28. The bore holes lead downwards via the indentions 31, 32 to the main gas lines. The gas flow is marked by a broken line and by arrows. The heated wire systems can be kept so small that for the chamber body a diameter of 20 mm. will be obtained and a height of 40 mm. including support and lid. This allows in a most simple way to eliminate all influences which might be caused by temperature by providing a chamber body designed as a thermostat. For this purpose it is surrounded by a suitable heating winding 33. The latter is connected by a contact thermometer 35 being arranged in a boring 34 so that the temperature feeling unit is placed on one side directly to the heating winding. The measuring chambers proper are situated in part 39 which is separated from the other chamber body 38 by a heat insulating layer 36 in order to damp temperature fluctuations as far as possible.

It has already been outlined above that when using the instrument for the determination of combustible gases by means of catalytic combustion, the heated wire system for the measuring chamber must be provided with a cover having a catalytic effect.

For the gas analysis based on magnetic properties there is an inhomogeneous magnetic field produced in the measuring chamber.

We claim:

1. Instrument for gas analysis comprising structure forming two chambers, one of which being adapted to be filled with the gas to be tested and the other with a comparison gas, each of said chambers containing a heating body normally surrounded by the respective gas, each heating body containing two heating wires electrically insulated from one another, the resistance of which varies with their temperature, the heating body being of gas impervious insulating material and surrounding at least the major length of each wire, a Wheatstone bridge, all four heating wires connected into the Wheatstone bridge, those heating wires combined into a common chamber lying in opposite legs of the bridge, a current source for the bridge, and means for measuring the current in the diagonal of the bridge, said two heating wires in a common chamber being twisted and surrounded by a common protective sleeve.

2. Instrument for gas analysis comprising structure forming two chambers one of which being adapted to be filled with the gas to be tested and the other with a comparison gas, each of said chambers containing a heating body normally surrounded by the respective gas, each heating body containing two closely spaced heating wires electrically insulated from one another and a common protector of circular cross section around the wires for protecting same from the surrounding gas, the resistance of said wires varying with their temperature, all four heating wires connected into a Wheatstone bridge, those heating wires combined into a common chamber lying in opposite legs of the bridge, a current source for the bridge, and means for measuring the current in the diagonal of the bridge.

3. Instrument for gas analysis according to claim 2, said protector being a narrow tube provided with at least two channels each of which contains one of said two heating wires.

4. Instrument for gas analysis in combination with a Wheatstone bridge comprising structure forming two chambers one of which being adapted to be filled with the gas to be tested and the other with a comparison gas, each of said chambers containing a heating body normally surrounded by the respective gas, each heating body containing two heating wires electrically insulated from one another and a common protector of circular cross section around the wires for protecting same from the surrounding gas, the resistance of said wires varying with their temperature, all four heating wires connected into the Wheatstone bridge, those heating wires combined into a common chamber lying in opposite legs of the bridge, a current source for the bridge, and means for measuring the current in the diagonal of the bridge, said protector being a narrow tube having four channels, said two heating wires combined into a common chamber being shaped each like a hair pin their legs being inserted into said channels, said tube being closed at that end where the legs of the hair pin shaped heating wires join so that the junction of the wires is covered.

5. Instrument for analysing gases in their thermal conductivity in connection with a Wheatstone bridge comprising two chambers one of which being adapted to be filled with the gas to be tested the other with a comparison gas, each of said chambers containing a heating body surrounded by the respective gas, each heating body including a glass sheath having the exterior thereof exposed to the respective gas and having in the sheath two closely spaced heating wires electrically insulated from one another, the resistance of which varying with their temperature, all four heating wires being connected into the Wheatstone bridge, those heating wires combined in a common chamber lying in opposite legs of the bridge, means for measuring the current in the diagonal of the bridge, and a surrounding metallic structure.

6. Instrument for analysing gases by determining their combustion heat comprising a Wheatstone bridge, two chambers each adapted to contain a test gas and comparison gas respectively, each of said chambers containing a heating body, each heating body including a glass sheath having the exterior thereof exposed to the respective gas and having in the sheath two heating wires electrically insulated from one another, the resistance of which varying with their temperature, all four heating wires being connected into the Wheatstone bridge, those heating wires combined into a common chamber lying in opposite legs of the bridge, a catalytic member in the test-gas chamber for promoting combustion of combustible gaseous mixtures therewithin, a current source for the bridge, means for measuring the current in the diagonal of the bridge, and a surrounding metallic structure.

7. Instrument for analysing gases by catalytic combustion comprising two chambers for containing gas, each of said chambers containing a heating body, each heating body including a glass sheath having the exterior thereof exposed to the respective gas and having in the sheath two heating wires electrically insulated from one another, the resistance of which varying with their temperature, a Wheatstone bridge, all four heating wires being connected into the bridge, those heating wires combined into a common chamber lying in opposite legs of the bridge, a current source for the bridge, means for measuring the current in the diagonal of the bridge, and a surrounding metallic structure; catalytic means coating the heating body which is surrounded by the gas to be measured.

8. Instrument for analysing gases by their magnetic properties comprising two chambers, each of said chambers containing a heating body, each heating body including a glass sheath having the exterior thereof exposed to the respective gas and having in the sheath two heating wires electrically insulated from one another the resistance of which varying with their temperature, a Wheatstone bridge, all four heating wires being connected into the Wheatstone bridge, those heating wires combined into a common chamber lying in opposite legs of the bridge, a current source for the bridge, means for measuring the current in the diagonal of the bridge, and a surrounding metallic structure; means to produce a permanent inhomogeneous metallic field in one of said two chambers.

9. An instrument for gas analysis comprising structure forming a chamber for a gas; a longitudinal glass body in the chamber and having a long stem portion of reduced diameter, and a large hollow end portion of increased diameter; glass tubes in the large end portion; the stem portion being provided with stem bores respectively in communication with the bores of the tubes, the structure of the large end portion merging with the tubes at their end portions in an integral structure; resistance wires in the respective stem bores, a pair of the wires being electrically connected near the outer end portion of the stem, and means at the end of the stem cooperating with a portion of said stem for protecting the wires from said gas within in the chamber.

10. In an instrument as claimed in claim 9 and lead wires in the tubes and connected to the resistance wires in the zone of the merging portion.

11. An instrument for gas analysis comprising structure forming a longitudinal chamber for a gas; a longitudinal glass body in the chamber and of substantially circular cross section and having a long projecting portion of reduced diameter, and a large hollow end portion of increased diameter; four glass tubes in the large end portion; the projecting portion being provided with four fine bores respectively in communication with the bores of the tubes, the structure of the large end portion merging with the tubes at their end portions in an integral structure; four resistance wires in the respective fine bores, each pair being electrically connected near the outer end portion of the portion, and a terminal part at the outer end portion of the projecting portion, said part and projecting portion protecting the wires from said gas within in the chamber.

12. An instrument for gas analysis comprising structure forming a longitudinal chamber for a gas; a longitudinal glass body in the chamber and of substantially circular cross section and having a long stem portion of reduced diameter, and a large hollow end portion of increased diameter; four glass tubes in the large end portion having axes parallel with that of the body; the stem portion being provided with four stem bores respectively in communication with the bores of the tubes, the structure of the large end portion merging with the tubes at their end portions in an integral structure; four resistance wires in the respective stem bores, each pair being electrically connected near the outer end portion of the stem, and capping means at the end of the stem, said means and stem protecting the wires from said gas within in the chamber.

13. An instrument for gas analysis comprising a Wheatstone bridge and source of current therefor; structure forming two elongated gas chambers for test gas and comparison gas respectively; a pair of heater wires in each chamber and extending at least the major part of the distance from one end to the other of each chamber the wires being constantly adjacent to each other; substantially solid electrical insulating material about the wires to insulate the wires of said pair from each other, the two wires of the pair being out of electrical contact with each other within the chamber and the insulation about one wire of the pair being in heat conductive relationship with the insulation about the other wire so that the heat from the wires will be uniformly distributed to the insulation and the gas surrounding the insulation; the pair of wires in each chamber forming opposite legs of the bridge, and means for detecting current in the diagonal of the bridge.

14. An instrument as claimed in claim 13, said material holding said wires substantially fast with respect to each other to minimize movement of the shadow thrown on the walls of the chamber by one wire and the radiation from the other wire as the wires expand and contract with temperature changes.

15. An instrument as claimed in claim 13, said wires and material forming a substantially integral heating element.

References Cited in the file of this patent

UNITED STATES PATENTS

| | | |
|---|---|---|
| 1,364,080 | Davisson | Jan. 4, 1921 |
| 1,463,005 | Dalton | July 24, 1923 |
| 1,818,619 | Harrison | Aug. 11, 1931 |
| 1,829,649 | Harrison | Oct. 27, 1931 |
| 1,971,038 | Hamilton | Aug. 21, 1934 |
| 2,045,640 | Fredericks | June 30, 1936 |
| 2,154,862 | Olshevsky | Apr. 18, 1939 |
| 2,178,548 | Black et al. | Nov. 7, 1939 |
| 2,237,558 | Hutton | Apr. 8, 1941 |
| 2,269,850 | Hebler | Jan. 13, 1942 |
| 2,298,288 | Gerrish et al. | Oct. 13, 1942 |
| 2,329,840 | Keinath | Sept. 21, 1943 |
| 2,618,150 | Willenborg | Nov. 18, 1952 |
| 2,693,103 | Krupp | Nov. 2, 1954 |

FOREIGN PATENTS

| | | |
|---|---|---|
| 367,980 | Germany | Jan. 30, 1923 |
| 251,170 | Great Britain | Apr. 29, 1926 |
| 466,391 | Great Britain | May 27, 1937 |
| 712,762 | Germany | Oct. 24, 1945 |
| 802,954 | Germany | Feb. 26, 1951 |